United States Patent [19]

Wright et al.

[11] Patent Number: 4,512,891

[45] Date of Patent: Apr. 23, 1985

[54] PLEATED FILTER ELEMENT WITH CONTROLLED EXPANSIBILITY AND FRAME THEREFOR

[75] Inventors: Mervin E. Wright, Apple Valley; Donald D. Gronholz, Minneapolis, both of Minn.

[73] Assignee: Donaldson Company, Inc., Minneapolis, Minn.

[21] Appl. No.: 442,234

[22] Filed: Nov. 16, 1982

[51] Int. Cl.³ .................... B01D 27/06; B01D 46/52
[52] U.S. Cl. .................... 210/445; 210/450; 210/451; 210/493.5; 210/495; 55/497; 55/502; 55/524; 156/202
[58] Field of Search ............... 210/232, 238, 239, 236, 210/240, 385, 386, 443, 447, 450, 451, 459, 478, 479, 481, 484, 486, 487, 493.1, 493.3, 493.5, 495, 498, 445; 55/497, 502, 510, 511, 498, 521, 524, 132, 529, 484, 485, 159, DIG. 5; 156/202, 227

[56] References Cited

U.S. PATENT DOCUMENTS

| | | | |
|---|---|---|---|
| 2,880,860 | 4/1959 | Gardiner, Jr. et al. | 55/497 |
| 2,907,408 | 10/1959 | Engle et al. | 210/493.1 |
| 2,980,208 | 4/1961 | Neumann | 210/493.5 |
| 3,218,784 | 11/1965 | Greiner | 55/497 |
| 3,410,062 | 11/1968 | Hart | 55/497 |
| 3,418,794 | 12/1968 | Roberts | 210/495 |
| 3,471,023 | 10/1969 | Rosaen | 210/493.1 |
| 3,636,683 | 1/1972 | Francis et al. | 55/497 |
| 3,640,396 | 2/1972 | Brownell | 210/493.1 |
| 3,712,033 | 1/1973 | Gronholz | 210/493.1 |
| 3,717,256 | 2/1973 | Parrott et al. | 210/495 |
| 3,779,389 | 12/1973 | Fant | 210/495 |
| 4,151,095 | 4/1979 | Wright | 210/443 |

FOREIGN PATENT DOCUMENTS

| | | | |
|---|---|---|---|
| 795282 | 3/1936 | France | 55/521 |
| 1512958 | 1/1978 | United Kingdom | 210/493.3 |

*Primary Examiner*—Richard V. Fisher
*Assistant Examiner*—Wanda L. Millard
*Attorney, Agent, or Firm*—Merchant, Gould, Smith, Edell, Welter & Schmidt

[57] ABSTRACT

A filter assembly (10) includes a frame (10 and 12) and means (10, 32, 34, 36, 38, 44, 48, and 50) releasably retaining a replaceable pleated filter element (14) therein. The edges of the pleats (68) of the filter element (14) are folded over diagonal fold lines (70) and tucked between adjacent pleats in a manner which provides control expansibility and substantially even pleat spacing upon expansion after storage in collapsed condition.

18 Claims, 10 Drawing Figures

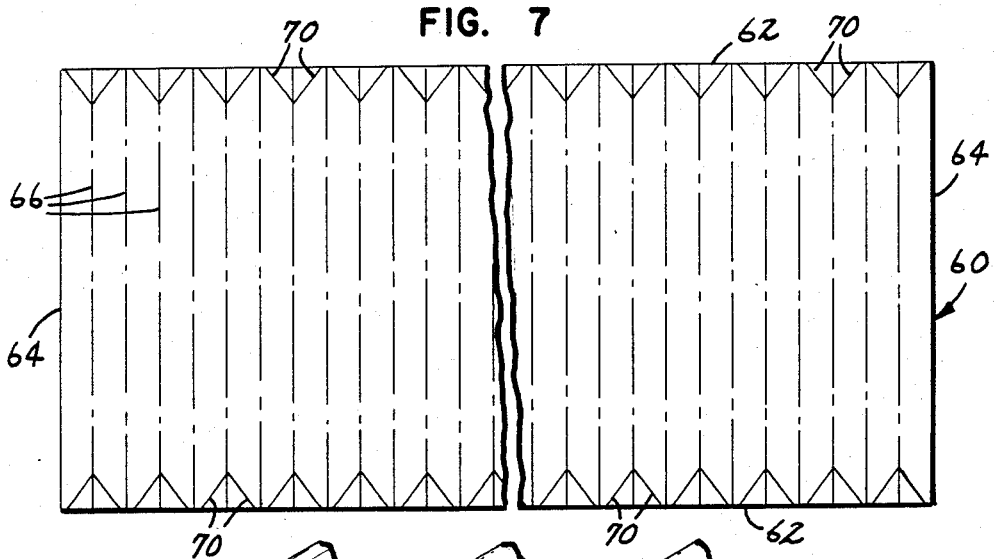
FIG. 7
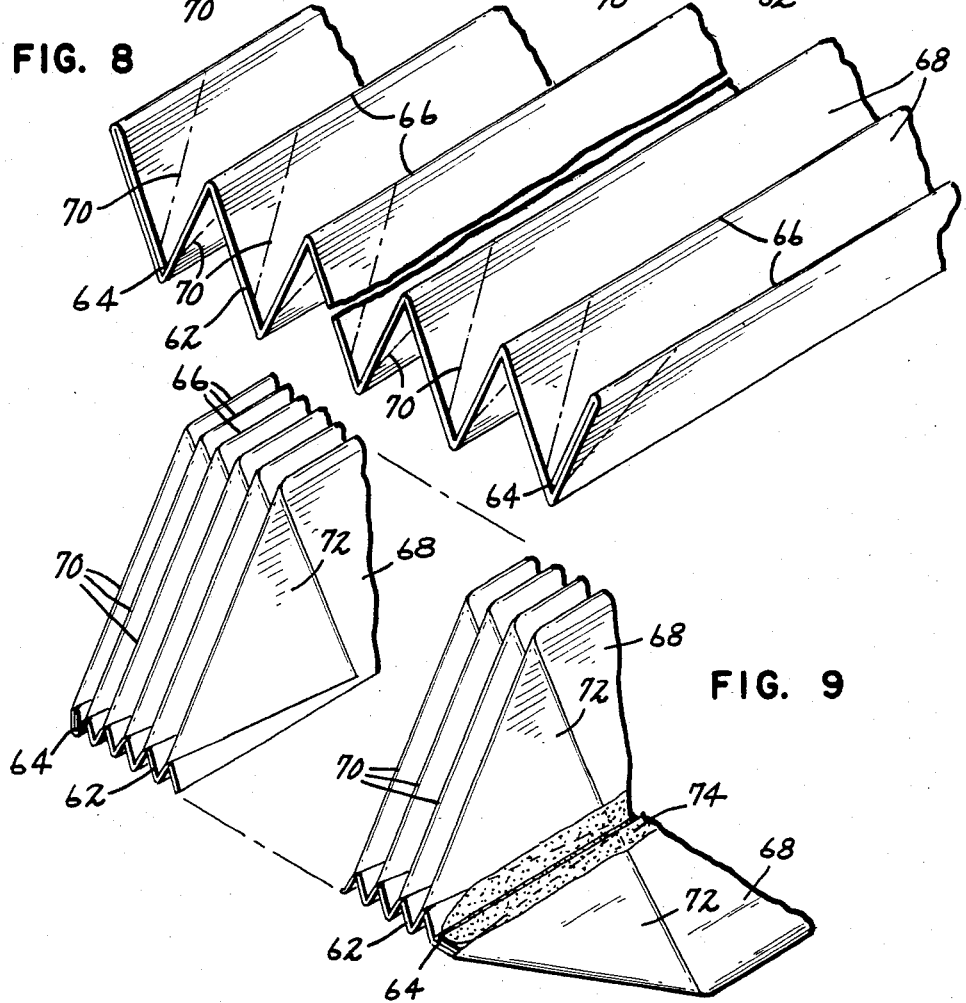
FIG. 8
FIG. 9

PLEATED FILTER ELEMENT WITH CONTROLLED EXPANSIBILITY AND FRAME THEREFOR

TECHNICAL FIELD

The present invention relates generally to filter assemblies, and more particularly to a filter having a replaceable pleated filter element adapted to provide controlled expansibility and substantially uniform pleat spacing characteristics upon expansion after storage/shipment in collapsed condition.

BACKGROUND ART

Many different types of filter assemblies have been developed heretofore for various filtering applications. One of the most popular and commonly used filter assemblies is in the form of a flat panel. Such filter assemblies generally consist of a filter element supported by a surrounding peripheral frame, and are usually of relatively inexpensive construction for removal and replacement as a unit.

Pleated filter elements are typically used to increase the filtering surface area and thus efficiency of such filter assemblies, however, there are some difficulties associated with the use of pleated filter elements. For example, pleated filter elements usually include both zigzag and straight edges requiring different sealing techniques with the frame. This can be a significant cost factor in such disposable assemblies.

Attempts have been made to alleviate this sealing problem by folding the ends of the pleats to facilitate engagement along opposite sides of the filter element. For instance, U.S. Pat. No. 4,151,095 assigned to Donaldson Company, Inc., shows a pleated filter element wherein opposite ends of the pleats are folded over diagonal score lines extending at forty-five degree angles from the intersections of the transverse fold lines of their adjacent pleats and the edges to points on the fold lines of their respective pleats. The inwardly folded edges of the pleats and the outwardly folded sides of the endmost pleats are then clamped between suitable retaining structure on the frame for sealing purposes. U.S. Pat. No. 3,640,396 shows a pleated filter element wherein opposite ends of the pleats are folded over diagonal score lines extending at sixty degree angles from points on the transverse fold lines to points on the edges inwardly from the adjacent fold lines defining the pleats.

Other difficulties associated with the use of filter assemblies having pleated filter elements have centered around the fact that they are pre-assembled with the pleated filter elements usually being glued or potted in place in their frames. The attitude of the filter during storage and shipment can be critical. It is best if they are shipped in horizontal position, or at least in a vertical position with the pleats vertical to minimize the effect of shocks on the filter assembly, which in turn can cause disconnection of the zig-zag ends of the pleats and thus bunching. If, for example, about 25% of the pleats become bunched together, this in turn can cause a reduction of about 50% in the filter capacity upon installation. Another related problem is that many filter assemblies simply are not being changed at the recommended intervals because they are relatively bulky and thus difficult to handle and store.

Heretofore there has not been available a pleated filter element which is particularly adapted for shipment in collapsed condition and which when expanded provides controlled expansibility and pleat spacing characteristics to facilitate use as a replaceable filter element. Nor has there been available a frame which is particularly adapted to receive such a replaceable pleated filter element. There is thus a need for such a filter.

SUMMARY OF INVENTION

The present invention comprises a filter assembly which overcomes the foregoing and other difficulties associated with the prior art. In accordance with the invention, there is provided a filter assembly comprising a frame, a pleated filter element supported in the frame, and means for releasably retaining the filter element in sealed engagement in the frame. Inwardly spaced flanges are provided on opposite ends of the frame for receiving the ends of the pleated filter element, and spring-biased bars are provided on the other opposite sides of the frame for releasably engaging the folded ends of the pleats at each side of the filter element. The ends of the pleats are folded over diagonal score or fold lines extending from points positioned laterally inward from the edges along alternate transverse fold lines to points positioned longitudinally inward from the two adjacent transverse fold lines along the edges, and tucked between adjacent pleats so as to provide controlled expansibility and substantially uniform spacing between the pleats upon expansion following shipment and/or storage in collapsed condition. The diagonal fold lines are oriented at predetermined angles of less than forty-five degrees, depending upon the expansion factor desired, so that the folded ends of the pleats are constrained in tucked positions between the pleats, which in turn are constrained against uncontrolled expansion.

BRIEF DESCRIPTION OF DRAWINGS

A better understanding of the invention can be had by reference to the following Detailed Description in conjunction with the accompanying Drawings, wherein:

FIG. 7 is a plan view of a sheet of filter material showing the various fold lines for constructing the pleated filter element of the invention;

FIGS. 8 and 9 are perspective illustrations showing the constructional steps of the pleated filter element herein.

DETAILED DESCRIPTION

Figure 1:
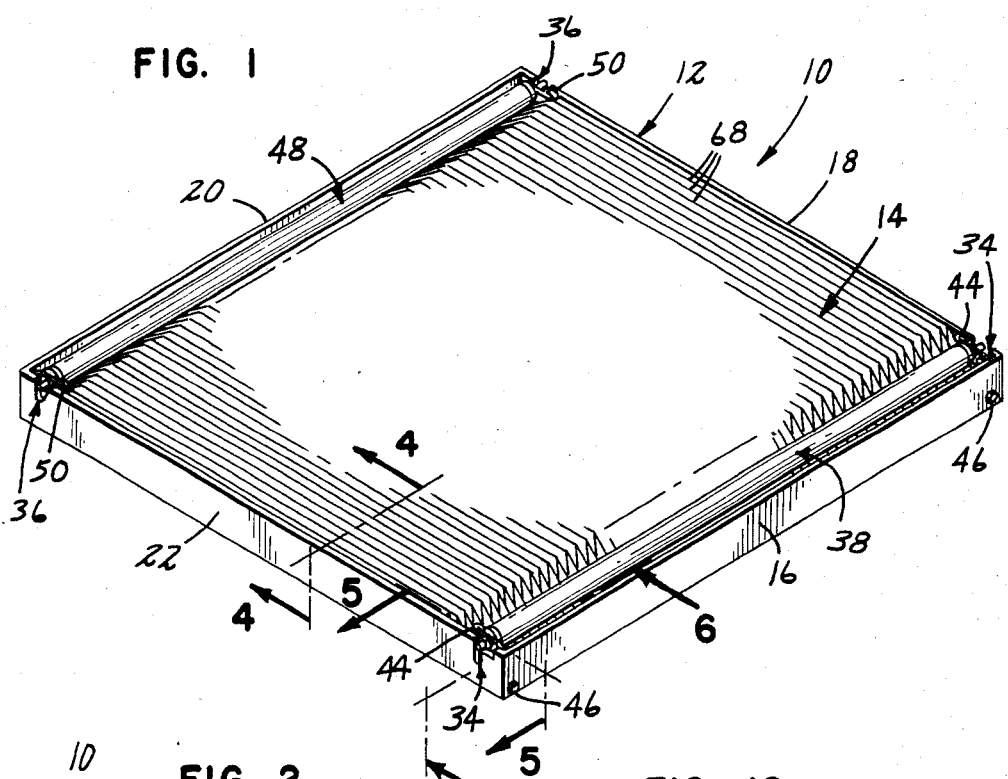
FIG. 1 is a perspective view of the filter assembly incorporating the invention.

Referring now to the Drawings, wherein like reference numerals designate line or corresponding elements throughout the views, and particularly referring to FIG. 1, there is shown a filter assembly 10 incorporating the invention. The filter assembly 10 is of the flat panel type which is commonly used in various applications for filtration of air moving through equipment. As illustrated, the filter assembly 10 is particularly adapted for use with duplicating or copying equipment, for example; however, it will be understood that the invention can be adapted to other applications. As will be explained more fully hereinafter, the filter assembly 10 comprises a frame 12 with a replaceable pleated filter element 14 therein which provides controlled expansibility characteristics.

Figure 2:
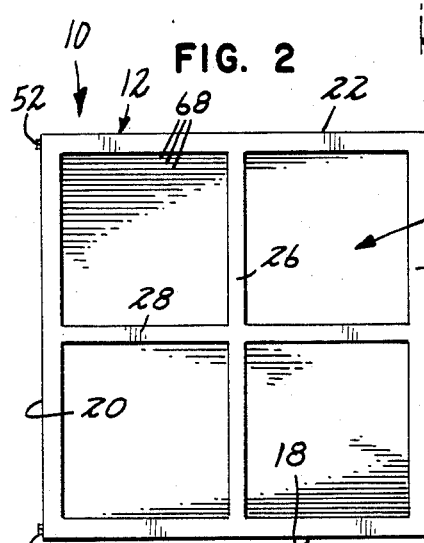
FIG. 2 is a reduced plan view of the bottom side of the filter assembly shown in FIG. 1.

Referring now to FIGS. 2 through 6 in conjunction with FIG. 1, the constructional details of the filter assembly 10 can be seen. The frame 12 comprises four upstanding side walls 16,18,20,22 secured in end-to-end relationship about the periphery of a bottom wall 24 so as to define a recessed cavity for receiving the pleated filter element 14. The frame 12 can be of integral construction molded from plastic or other suitable material. If desired, cross members 26,28 can be provided between the sides of the bottom wall 24 as shown in FIG. 2 to enhance rigidity of the frame 12. It will thus be appreciated that the frame 12 basically comprises a structure for receiving and peripherally supporting the pleated filter element 14.

Figure 3:
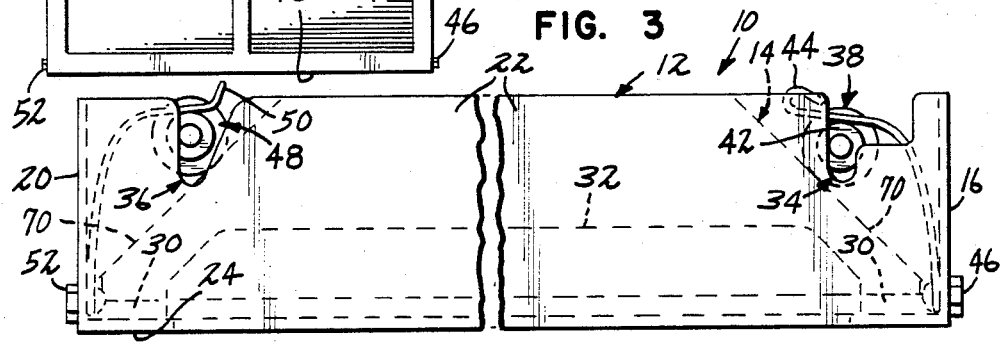
FIG. 3 is an enlarged side view of the filter assembly shown in FIG. 1.
Figure 4:
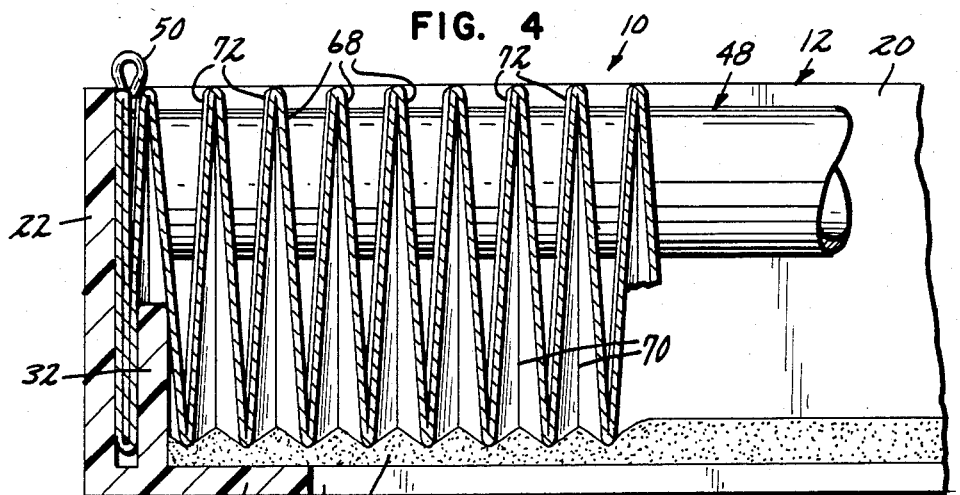
FIG. 4 is an enlarged partial cross-sectional view taken along lines 4—4 of FIG. 1 in the direction of the arrows.
Figure 5:
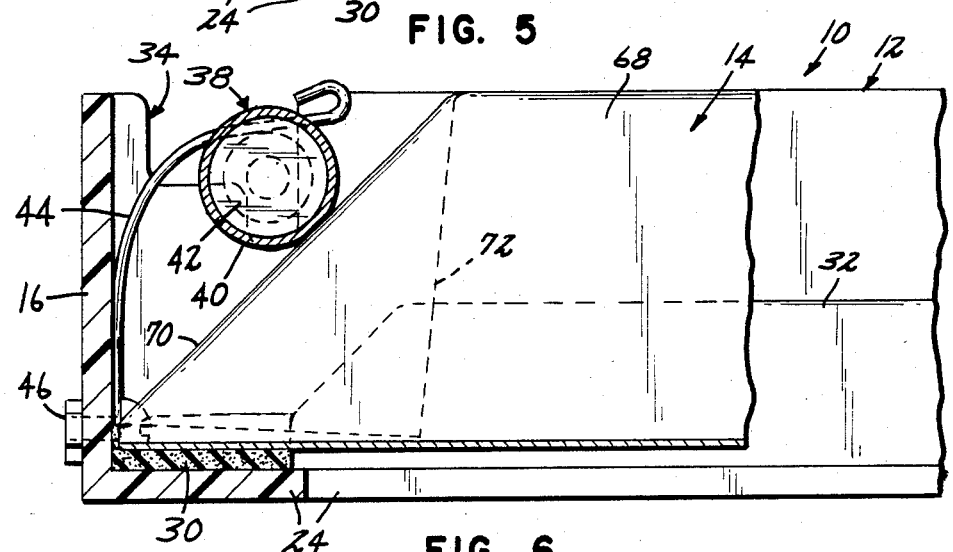
FIG. 5 is an enlarged partial cross-sectional view taken along lines 5—5 of FIG. 1 in the direction of the arrows.
Figure 6:
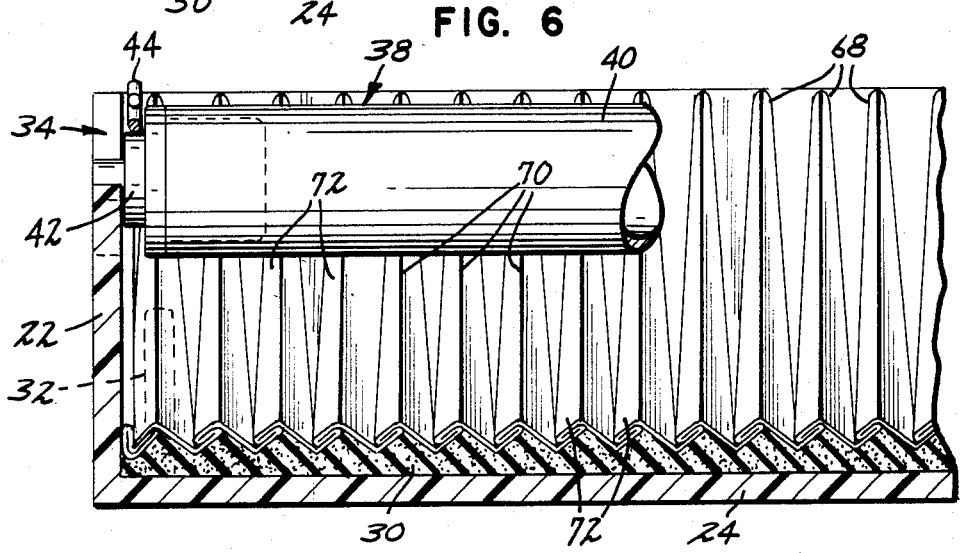
FIG. 6 is an enlarged partial cross-sectional view taken along lines 6—6 of FIG. 1 in the direction of the arrows.

The frame 12 includes means for sealing the periphery between the pleated element 14 and the frame. In the preferred embodiment, as is best seen in FIGS. 4 and 5, seals or gaskets 30 are provided on the inside surface of the bottom wall 24 adjacent to side wall 16 and the opposite side wall 20. Gaskets 30 can be formed of foam rubber or other suitable material attached, such as by means of adhesive, to the frame 12. The purpose of gaskets 30 is to provide a seal between the frame 12 and the opposite ends of the pleats of the filter element 14. A flange 32, as is best seen in FIGS. 3 and 4, is provided on the inside surface of the bottom wall 24 adjacent to the side wall 18, and a similar flange is also provided on the inside surface of the bottom wall adjacent to the opposite remaining side wall 22 of the frame. The purpose of flanges 32 is to snugly receive the opposite folded ends of the pleated filter element 14.

The frame 12 further includes means for releasably retaining the filter element 14 therein. In the preferred embodiment, a pair of notches 34,36 are provided at opposite ends of the side walls 18,22 of frame 12. Notches 34 are located adjacent to side wall 16, whereas notches 36 are located adjacent to the opposite side wall 20. Notch 34 is adapted to receive the ends of a rod 38 which, as illustrated and best seen in FIG. 6, comprises a hollow tube 40 with end pieces 42 therein defining spindles. The notches 34 receive the outermost portions of the end pieces 42, while tube 40 extends across and engages the tops of the folded edges of the pleated filter element 14. The rod 38 is releasably retained in the notches 34 by means of spring clips 44 which are secured at their lower ends by fasteners 46 extending through the side wall 16. The notches 36 are also adapted to receive opposite ends of a rod 48 which is of similar construction to the rod 38. Rod 48 is releasably retained in the notches 36 by a pair of spring clips 50 secured at their lower ends to the side wall 20 by fasteners 52. The rods 38,48 thus engage the upper folded edges of opposite sides of the pleated filter element 14 and urge them into sealing engagement with the underlying gaskets 30.

With particular reference to FIGS. 3 and 5, the notches 34 are preferably of stepped configurations as shown so that the rod 38 can be disengaged and moved away from one edge of the filter element 14 such that it is only necessary to remove the rod 48 entirely from the frame 12 in order to remove and replace the filter element 14. In other words, only the rod 48 would require removal while the rod 38 could simply be repositioned in slots 34 for removal and replacement of the filter element 14.

The constructional details of the pleated filter element 14 are best understood by reference to FIGS. 7 through 9. The filter element 14 is constructed from a sheet 60 of filter material, which is initially flat. The sheet 60 can be formed from paper, cellulose or any other suitable filter media. The sheet 60 includes opposite side edges 62 and opposite end edges 64, and is divided into transverse sections by score or fold lines 66. The sheet is folded along the longitudinally spaced transverse score or fold lines 66, and in alternate directions, to form a plurality of symmetrical pleats 68.

The ends of pleats 68 are then folded in a common direction over diagonal score or fold lines 70. A pair of fold lines 70 are provided on the adjacent sections at each end of the pleats 68 defined by the transverse fold lines 66. Each diagonal fold line 70 extends from a point located along an alternate transverse fold line 66 and laterally inward of the side edge 62 of the sheet 60, to a point located along the corresponding side edge and longitudinally inward of each adjacent transverse fold line. The diagonal fold lines 70 are angled at less than forty-five degrees to the transverse fold lines 66, and are preferably angled at about thirty-seven degrees to about forty-two degrees for the desired tuck. The diagonal fold lines 70 thus do not extend between adjacent transverse fold lines 66, but rather extend between the transverse fold lines and the side edges 62 of the sheet 60 in accordance with a predetermined relationship, to be discussed more fully hereinafter, which provides for controlled expansibility and pleat spacing characteristics of the pleated filter element 14.

The folded over ends 72 of pleats 68 are then oriented in a common direction toward one end of sheet 60 and tucked in between the adjacent pleats as shown in FIG. 9. When so folded over and tucked in, the ends 72 are constrained between the pleats 68 which in turn are prevented by the folded, tucked ends from uncontrolled expansion and unfolding. It is the top diagonal edges of these folded ends 72 which are engaged by retaining rods 38 and 48.

The end edges 64 of sheet 60 are preferably folded inwardly along their adjacent transverse fold lines 66, as is best seen in FIG. 8, to form a double layer of material for reinforcement and for purposes of a snug fit behind flanges 32. In accordance with the preferred embodiment, the folded ends 72 of the endmost pleat 68 are folded in a direction against that of the other folded ends to a tucked position between the adjacent pleat. Adhesive 74 is preferably provided between the endmost pleats 68 and their next adjacent pleat to prevent the folded end 72 from unfolding and becoming untucked.

Figure 10:
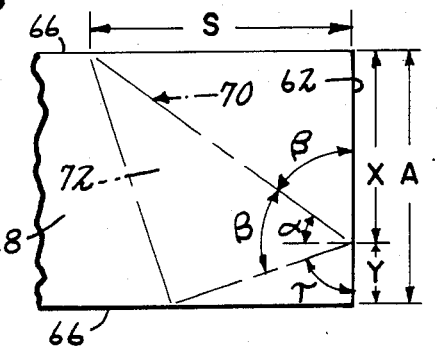
FIG. 10 is a diagram of the end of a pleat showing the relationship between the diagonal fold line, transverse fold lines, and the edge of a pleat of the pleated filter element herein.

A better understanding of the relationship between the diagonal fold lines 70, transverse fold lines 66 and longitudinal side edges 62 will be had by reference to FIG. 10. The end of a pleat 68 before folding is shown in full lines, while the folded over end 72 thereof after folding is shown in phantom lines. S indicates the setback distance inwardly from the longitudinal side edge 62 at which each diagonal fold line 70 intersects its corresponding transverse fold line 66. Y indicates the relief distance longitudinally inward from each adjacent transverse fold line 66 at which the other end of the diagonal fold line 70 intersects the side edge 62. A indicates the depth of the pleat 68, which corresponds to the distance between adjacent transverse fold lines 66. The following expressions can thus be derived:

$$X = A - Y$$

$$\alpha + \beta = 90°$$

$$2\beta + \tau = 180°$$

$$\cos \tau = Y/X$$

From these expressions, it will be apparent that the setback S can be defined by the relief Y and the fold angle $\alpha$. The maximum approximate expansion potential (from collapsed condition) of the pleated filter element 14 is thus a function of the inclination of the fold lines 70, which in turn are determined by the relationship between the set back distance S, relief distance Y, pleat depth A, and the fold angle $\alpha$.

The following table exemplifies this relationship:

| Y/A (%) | S/A (%) | α (°) | Approximate Expansion Factor Multiplier |
|---|---|---|---|
| 5 | 100.14 | 43.492 | 2.5 |
| 10 | 100.62 | 41.810 | 5.0 |
| 15 | 101.59 | 39.918 | 7.5 |
| 20 | 103.28 | 37.761 | 10.0 |
| 25 | 106.06 | 35.264 | 12.5 |
| 30 | 110.68 | 32.311 | 15.0 |

It will be noted that the expansion factor multiplier is inversely related to the fold angle $\alpha$, which must be less than forty-five degrees to achieve the proper tuck of ends 72 between the pleats 68. In most instances, the fold angle $\alpha$ will usually range between about thirty-seven degrees and forth-two degrees. Fold angles $\alpha$ less than about thirty degrees are impractical. The ratio between the set back distance S and the distance A between adjacent transverse fold lines can range between about five percent and thirty percent.

From the foregoing, it will thus be apparent that the present invention comprises a filter assembly having numerous advantages over the prior art. The filter herein includes a frame which is adapted for use with a replaceable pleated filter element, and which includes means for releasably retaining the filter element in sealed engagement therewith. The pleated filter element provides controlled expansibility by folding opposite end of the pleats in a predetermined manner such that the folded over portions are tucked between adjacent pleats. The folded pleats and the folded, tucked end thereof constrain each other against unfolding such that substantially uniform pleat spacing is maitained upon expansion. The pleated filter element can thus be shipped and/or stored in collapsed condition subject to later expansion and use in the frame. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any equivalents, alternatives, modifications and/or rearrangements of elements falling within the scope of the invention as defined by the following claims.

We claim:

1. A filter assembly, comprising:
a pleated filter element having opposite sides;
said filter element including a sheet of filter media folded in alternate directions about longitudinally spaced-apart transverse fold lines to form accordion pleats extending between opposite edges and opposite ends of the sheet, the ends of at least some of the pleats on the same side of said filter element being folded inwardly about diagonal fold lines extending at predetermined angles between points spaced laterally inward along alternate transverse fold lines and points spaced longitudinally inward along the edges of the sheet from the next adjacent transverse fold lines toward the respective alternate transverse fold lines with the folded ends of the pleats being tucked between adjacent pleats so as to effect controlled pleat spacing and expansibility of said filter element;
a frame for peripherally supporting said filter element;
seal means positioned between said frame and filter elements; and
means for releasably retaining said filter element in said frame.

2. The filter assembly of claim 1, wherein said frame comprises a peripheral bottom wall and upstanding side and end walls constructed as an integral unit.

3. The filter assembly of claim 1, wherein said seal means comprises a flexible gasket provided on and extending about at least a portion of said frame.

4. The filter assembly of claim 1, wherein said releasable retaining means comprises;
means provided on opposite ends of said frame for engaging the endmost pleats of said filter element;
a pair of rods extending between opposite ends of said frames in engagement with the folded ends of the pleats of said filter element, said rods being received in notches formed in opposite ends of said frame; and
spring means for retaining said rods in the notches and urging said rods into engagement with said filter elements.

5. A filter assembly, comprising:
a frame;
a pleated filter element disposed within said frame, said filter element having opposite sides;
said element including a sheet of filter media folded in alternate directions about transverse fold lines to form accordion pleats extending between laterally spaced-apart edges and longitudinally spaced-apart ends, the ends of the pleats being folded inwardly about diagonal fold lines in a common direction toward one end of said filter element and tucked between adjacent pleats on the same side of said filter element, to effect controlled pleat spacing and expansibility of said filter element;

said diagonal fold lines extending at predetermined angles of inclination between about thirty-one degrees and forty-four degrees between points spaced laterally-inward along alternate transverse lines and points spaced longitudinally-inward along the edges of the sheet from the next adjacent transverse fold lines toward the respective alternate transverse fold lines;

means provided on opposite ends of said frame for retaining the endmost pleats of said filter element; and means provided along opposite sides of said frame for releasably engaging the folded ends of the pleats of said filter element.

6. The filter assembly of claim 1, wherein said means for retaining the endmost pleats of said filter element comprise flanges spaced inwardly from opposite ends and extending partially between the sides of said frame.

7. The filter assembly of claim 1, wherein said means for engaging the folded ends of the pleats of said filter element comprises;

a pair of rods, said rods extending between notches formed in opposite ends of said frame; and spring means for resiliently retaining said rods in the notches and for urging said rods into engagement with said pleated filter element.

8. The filter assembly according to claim 7, wherein the notches associated with one of said rods are of step configuration so that the rod can be disengaged from the said pleated filter element without removal from said frame.

9. A pleated filter element having controlled pleat spacing and expansibility characteristics, comprising:

a sheet of filter media having opposite edges, opposite sides, and opposite ends;

said sheet being divided into transverse sections by longitudinally-spaced transverse fold lines and folded in alternate directions about the transverse fold lines to form pleats; and the ends of said pleats along at least one edge being folded about diagonal fold lines in a common direction toward one end of said sheet and tucked between adjacent pleats on the same side of said sheet, said diagonal fold lines extending at predetermined angles of inclination between about thirty-one degrees and forty-four degrees between points positioned a predetermined setback distance laterally-inward along alternate transverse fold lines and points positioned a predetermined relief distance longitudinally-inward from immediately adjacent transverse fold lines along the edges of said sheet toward the respective alternate transverse fold lines.

10. The filter element of claim 9, wherein the endmost transverse sections of said sheet are folded back on the next most endmost sections about their adjacent transverse fold lines to reinforce the ends fo said filter element.

11. The filter element of claim 9, wherein the ends of the pleat at one end of said sheet are folded inwardly in a direction opposite that of the other pleat ends and tucked between the adjacent pleat in a hidden position.

12. The filter element of claim 9, wherein the ratio between the set back distance and the distance between adjacent transverse fold lines on said sheet ranges between about 5% and 30%.

13. The filter element of claim 9, wherein said diagonal fold lines are oriented at angles between about thirty-seven degrees and forty-two degrees.

14. A method of constructing a pleated filter element having controlled pleat spacing and expansibility characteristics, comprising the steps of:

providing a sheet of filter media having opposite edges, opposite sides, and opposite ends;

dividing the sheet into transverse sections by means of parallel substantially equally spaced transverse fold lines extending between the edges of said sheet;

folding the sheet in alternate directions about the transverse fold lines to form pleats;

folding the ends of the pleats along at least one edge on the same side of said sheet in a common direction toward one end of said sheet about diagonal fold lines oriented at predetermined angles of inclination between about thirty-one degrees and forty-four degrees, and extending from points spaced laterally-inward along alternate transverse lines to points spaced longitudinally-inward from the next adjacent transverse fold lines along the edges and toward the respective alternate transverse fold lines; and tucking the folded ends of the pleats inside and between adjacent pleats.

15. The method of claim 14, further including the steps of:

folding the endmost transverse section of said sheet back about their respective transverse fold lines and against the next adjacent transverse sheet section to form an end pleat;

the ends of the pleat at the one end of said sheet being folded in the direction opposite that of the folded ends of the other pleats and tucked between the adjacent pleat in a hidden position; and adhesively securing the end pleat to the adjacent pleat.

16. The method of claim 15, wherein the ratio between the relief distance and the distance between adjacent transverse fold lines on the sheet ranges between about 5% and 30%.

17. The method of claim 15, wherein the angles between the diagonal fold lines and their respective transverse fold lines is between about thirty-seven degrees and forty-two degrees.

18. The pleated filter element constructed according to the method of claim 15.

* * * * *